(12) United States Patent  (10) Patent No.: US 8,174,624 B2
Sakashita  (45) Date of Patent: May 8, 2012

(54) IMAGE PROCESSING APPARATUS AND IMAGE PROCESSING METHOD

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 12/724,913

(22) Filed: Mar. 16, 2010

(65) Prior Publication Data

US 2010/0253853 A1 Oct. 7, 2010

(30) Foreign Application Priority Data

Apr. 1, 2009 (JP) .................................. 2009-089575

(51) Int. Cl.
*H04N 7/00* (2011.01)
*H04N 11/00* (2006.01)
*H04N 5/00* (2011.01)
*H04N 5/14* (2006.01)
*H04N 3/14* (2006.01)
*G06K 9/40* (2006.01)
*G09G 3/30* (2006.01)

(52) U.S. Cl. ........ 348/687; 348/607; 348/620; 348/622; 348/673; 348/790; 348/497; 348/447; 348/441; 382/255; 382/262; 345/77

(58) Field of Classification Search .................. 348/607, 348/620, 622, 673, 687, 497, 449, 441, 448, 348/790; 382/255, 262; 345/77, 618
See application file for complete search history.

(56) References Cited

U.S. PATENT DOCUMENTS

| | | | |
|---|---|---|---|
| 5,416,644 A * | 5/1995 | Beuker et al. ................. | 386/353 |
| 6,501,451 B1 | 12/2002 | Sakashita ......................... | 345/87 |
| 7,262,818 B2 * | 8/2007 | Chuang et al. ................. | 348/790 |
| 7,602,440 B2 * | 10/2009 | Nishi et al. ..................... | 348/441 |
| 7,649,574 B2 * | 1/2010 | Toyooka ......................... | 348/744 |
| 7,800,691 B2 * | 9/2010 | Oyaizu et al. ................. | 348/441 |
| 7,852,327 B2 * | 12/2010 | Chen et al. ..................... | 345/204 |
| 2006/0227249 A1 * | 10/2006 | Chen et al. ..................... | 348/631 |
| 2009/0040374 A1 * | 2/2009 | Kobayashi ..................... | 348/448 |
| 2009/0040376 A1 * | 2/2009 | Kobayashi ..................... | 348/452 |
| 2009/0073192 A1 * | 3/2009 | Kobayashi ..................... | 345/643 |
| 2009/0167790 A1 * | 7/2009 | Lin et al. ........................ | 345/690 |
| 2009/0226110 A1 * | 9/2009 | Chen et al. ..................... | 382/263 |
| 2009/0273611 A1 * | 11/2009 | Itokawa et al. ............... | 345/619 |

(Continued)

FOREIGN PATENT DOCUMENTS

JP 11-126050 5/1999

(Continued)

*Primary Examiner* — Brian Yenke
(74) *Attorney, Agent, or Firm* — Fitzpatrick, Cella, Harper & Scinto (57) ABSTRACT

An apparatus outputs an image signal for each frame, divides a frame into sub-frames, acquires a first signal of high frequency components and a second signal of low frequency components of a sub-frame, and generates a third signal by multiplying the second signal by K. If a fourth signal obtained by adding the third signal to the first signal falls within a predetermined range, the apparatus outputs the third signal, whereas if the fourth signal includes a portion exceeding the range, the apparatus outputs a signal obtained by correcting the third signal. The apparatus also generates a composition signal of the output signal and the first signal and a fifth signal by multiplying the third signal by a correction amount y of the third signal. As a sub-frame of interest, either the composition signal or the fifth signal is output.

8 Claims, 8 Drawing Sheets

U.S. PATENT DOCUMENTS

| | | | |
|---|---|---|---|
| 2009/0327777 A1* | 12/2009 | Vasquez et al. | 713/320 |
| 2010/0098349 A1* | 4/2010 | Arashima et al. | 382/263 |
| 2010/0156772 A1* | 6/2010 | Arashima et al. | 345/87 |
| 2010/0259675 A1* | 10/2010 | Kawai | 348/452 |
| 2010/0265402 A1* | 10/2010 | Van Heesch et al. | 348/607 |
| 2010/0295867 A1* | 11/2010 | Wu et al. | 345/618 |
| 2010/0303374 A1* | 12/2010 | Mizuno | 382/260 |
| 2010/0310191 A1* | 12/2010 | Sato | 382/276 |
| 2011/0019095 A1* | 1/2011 | He et al. | 348/607 |
| 2011/0102479 A1* | 5/2011 | Kitada et al. | 345/690 |
| 2011/0110602 A1* | 5/2011 | Hiraki et al. | 382/260 |

FOREIGN PATENT DOCUMENTS

JP    2002-351382    12/2002

* cited by examiner

IMAGE PROCESSING APPARATUS AND IMAGE PROCESSING METHOD

BACKGROUND OF THE INVENTION

1. Field of the Invention

The present invention relates to a moving image processing technique.

2. Description of the Related Art

Liquid-crystal display devices have recently been used as TV receivers and display devices for PCs. Such liquid-crystal display devices can be formed into flat panel structures to save space and power, and hence are widely used. However, these liquid-crystal display devices have a low response speed with respect to moving images. As a method of driving liquid-crystal display devices to improve response speed, there has been proposed a method of performing overdriving in accordance with the result of comparison between image data to be displayed next and previous image data (patent reference 1 (Japanese Patent Laid-Open No. 11-126050)).

In addition, as a method of improving motion blurring due to the display characteristics of a liquid-crystal display device, there has been proposed a driving method that inserts a black frame or intermediate image by doubling the frame frequency of an input image signal (patent reference 2 (Japanese Patent Laid-Open No. 2002-351382)).

If, however, the amount of change in the high-frequency component of image data to be displayed is large, an obtained value used for image display may exceed the display range of the display. This leads to failures such as display deterioration and the display of unnecessary video components. If, for example, the LPF constant is changed to overcome such failures, the motion blurring improvement effect decreases (deteriorates).

SUMMARY OF THE INVENTION

The present invention has been made in consideration of the above problems, and provides a technique of enabling display fully using the dynamic range of display tones without the collapse of high-frequency components, and avoiding the display of unnecessary pseudo-components.

According to one aspect of the present invention, there is provided an image processing apparatus which processes and outputs an image signal input for each frame, comprising: a division unit which divides one frame into a plurality of sub-frames; an acquisition unit which acquires a first image signal constituted by high-frequency components and a second image signal constituted by low-frequency components from an image signal of a sub-frame of interest; a unit which generates a third image signal by multiplying the second image signal by a constant value K satisfying 0<K<1; a process unit which outputs the third image signal when a fourth image signal obtained by adding the first image signal and the third image signal falls within a predetermined range and outputs, when the fourth image signal includes a portion exceeding the range, an image signal obtained by correcting the third image signal so as that the portion does not exceed the range; a unit which generates a composition signal composed of the image signal output from the process unit and the first image signal; a unit which generates a fifth image signal by multiplying the third image signal by a constant value (2−γ) when γ represents a correction amount for the third image signal from the process unit; and an output unit which outputs one of the composition signal and the fifth image signal as the sub-frame of interest.

According to another aspect of the present invention, there is provided an image processing method performed by an image processing apparatus which processes and outputs an image signal input for each frame, comprising the steps of: dividing one frame into a plurality of sub-frames; acquiring a first image signal constituted by high-frequency components and a second image signal constituted by low-frequency components from an image signal of a sub-frame of interest; generating a third image signal by multiplying the second image signal by a constant value K satisfying 0<K<1; outputting the third image signal when a fourth image signal obtained by adding the first image signal and the third image signal falls within a predetermined range and outputting, when the fourth image signal includes a portion exceeding the range, an image signal obtained by correcting the third image signal so as that the portion does not exceed the range; generating a composition signal composed of the image signal output in the step of processing and the first image signal; generating a fifth image signal by multiplying the third image signal by a constant value (2−γ) when γ represents a correction amount for the third image signal in the step of processing; and outputting one of the composition signal and the fifth image signal as the sub-frame of interest.

Further features of the present invention will become apparent from the following description of exemplary embodiments with reference to the attached drawings.

DESCRIPTION OF THE EMBODIMENTS

The embodiments of the present invention will be described below with reference to the accompanying drawings. Note that each embodiment described below is a specific example of the present invention, and is a concrete embodiment of the arrangement described in the appended claims.

[First Embodiment]

Figure 2:
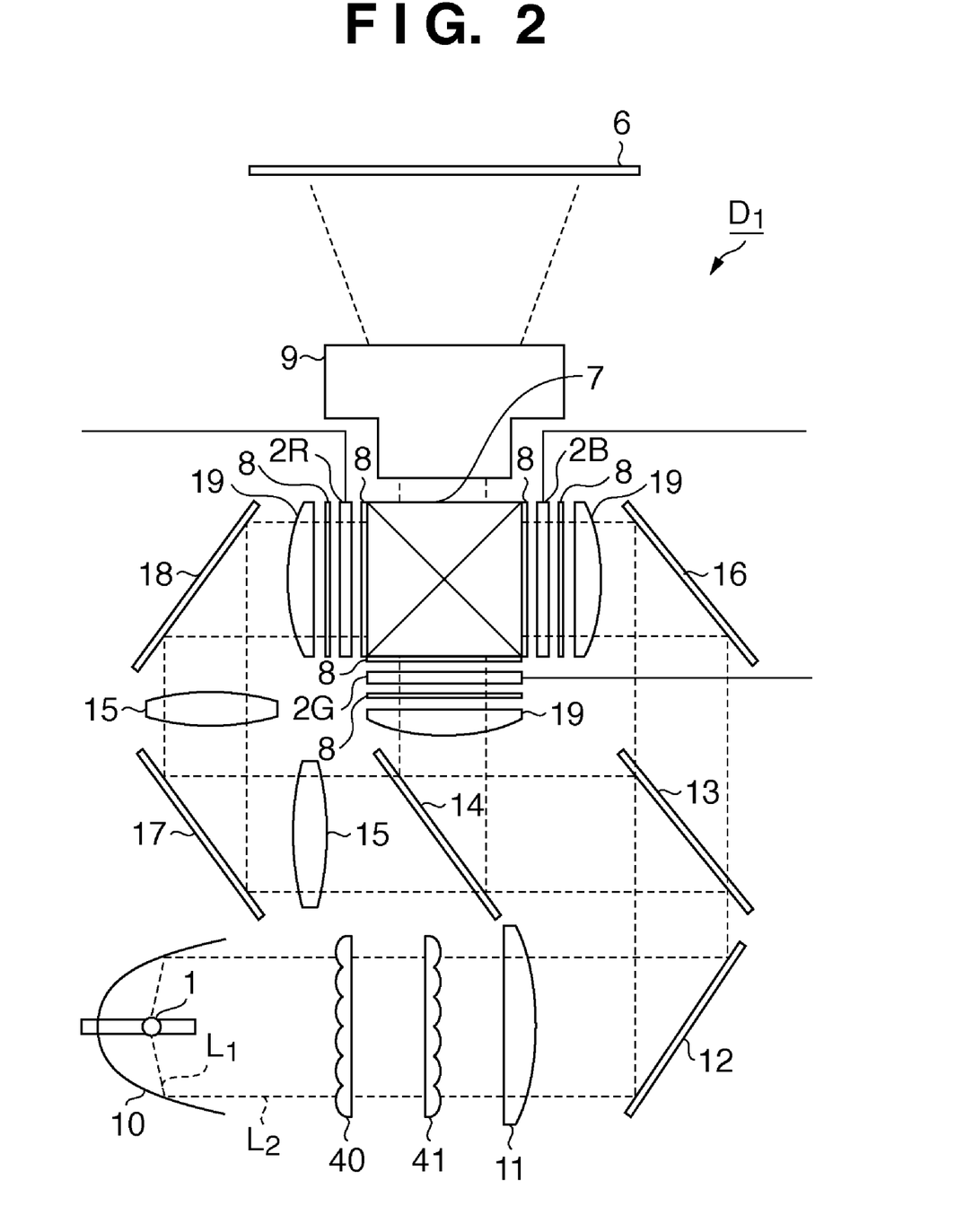
FIG. 2 is a view showing an example of the arrangement of a projection type display device, more specifically, an engine unit D1, to which an image processing apparatus according to the first embodiment of the present invention is applied.

FIG. 2 is a view showing an example of the arrangement of a projection type display device, more specifically, an engine unit D1, to which an image processing apparatus according to this embodiment is applied. Liquid-crystal panels 2R, 2G, and 2B as light modulation devices, respectively corresponding to R, G, and B, are arranged at positions facing a cross prism 7. This embodiment uses TN liquid-crystal panels, as the liquid-crystal panels 2R, 2G, and 2B, which are driven by using TFTs. Polarizing plates 8 are arranged on the two sides of each of the liquid-crystal panels 2R, 2G, and 2B. A projection lens 9 and a screen (a member on which projection is performed) 6 are arranged on the light exit side of the cross prism 7.

A parabolic reflector 10 surrounds a lamp (light source) 1 and is configured to convert exit light L1 from the lamp 1 into a parallel light beam L2. The reflector 10 need not be parabolic, and may be, for example, elliptic. In this case, the reflector 10 converts the exit light L1 from the lamp 1 into a condensed light beam.

As the lamp 1, a metal halide lamp, a xenon lamp, or the like can be used. Fly-eye integrators 40 and 41 are arranged on the optical path of light emitted from the lamp 1 so as to have a conjugate relationship with the liquid-crystal panels 2R, 2G, and 2B, thereby improving the non-uniformity of the light source.

Figure 3:
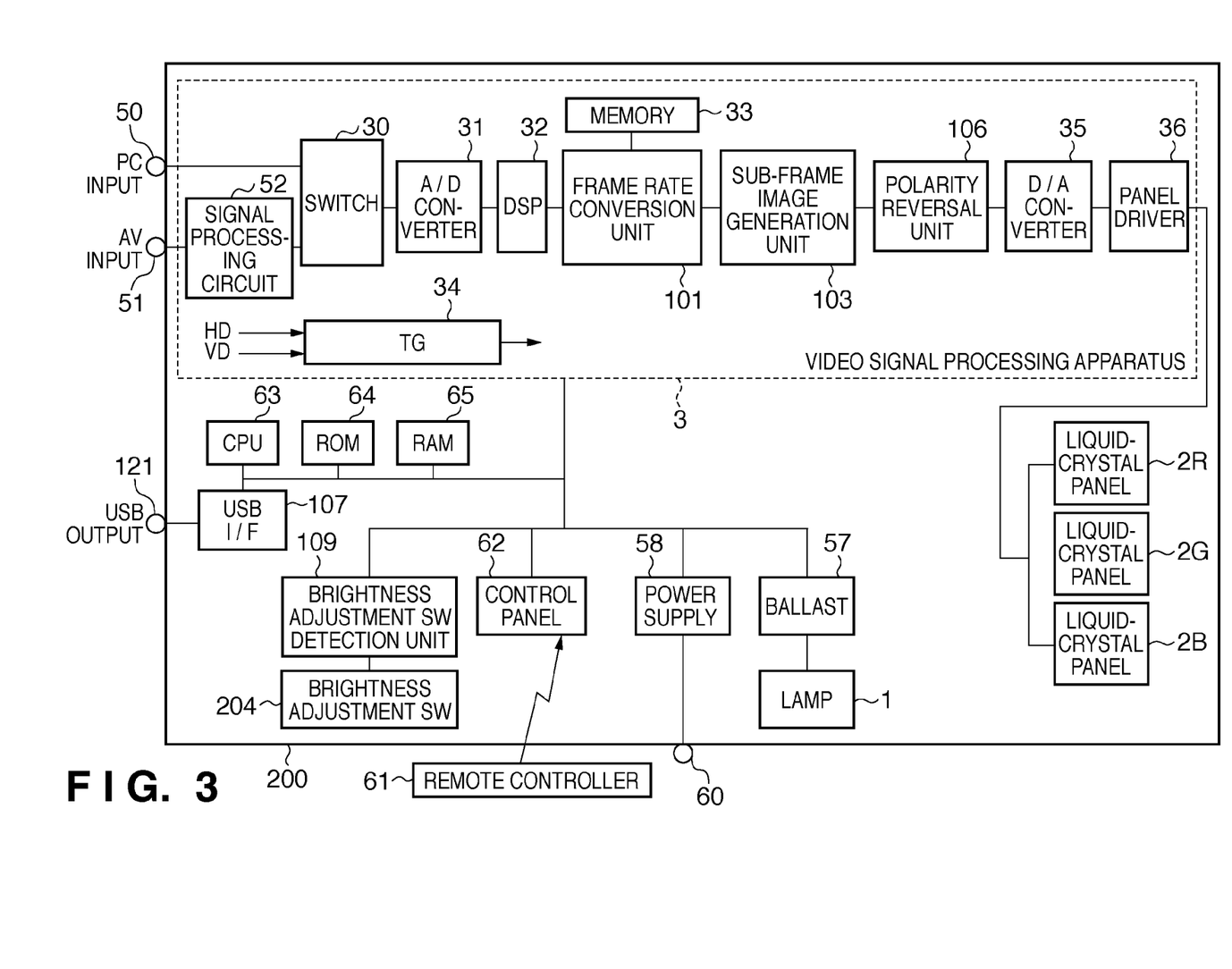
FIG. 3 is a block diagram showing an example of the hardware arrangement of a projection type display device 200 to which the image processing apparatus according to first embodiment of the present invention is applied.

A relay lens 11 and a mirror 12 are sequentially arranged on the light exit side of the fly-eye integrators 40 and 41. Two dichroic mirrors 13 and 14 are arranged on the subsequent stage to cause emitted light from the lamp 1 to branch into three light beams. A relay lens 15 and mirrors 16, 17, and 18 are arranged to guide the respective light beams branching from the emitted light to the liquid-crystal panels 2R, 2G, and 2B. Reference numeral 19 denotes a field lens. As shown in FIG. 3, a video signal processing apparatus 3 having the arrangement exemplified by FIG. 3 is connected to the liquid-crystal panels 2R, 2G, and 2B.

FIG. 3 is a block diagram showing an example of the hardware arrangement of a projection type display device 200 to which an image processing apparatus according to this embodiment is applied. In the video signal processing apparatus 3, a switch 30 selects one of the video signal input from a PC (Personal Computer) via a terminal 50 and the AV signal input from a terminal 51, and outputs the selected signal to an A/D converter 31 on the subsequent stage. The AV signal includes signals conforming to various types of standards such as NTSC and a video signal of a general TV broadcast program. This AV signal also includes the video signals obtained from a recording device (a video deck, DVD recorder, or HDD recorder) that records video signals on a medium and a playback device (a DVD player, LD player, or the like) which plays back a video signal recorded on a medium.

A signal processing circuit 52 performs signal processing, such as AV signal decoding, noise reduction processing, band-limit filtering, and signal level adjustment, for the AV signal input from the terminal 51. The A/D converter 31 converts an analog image signal, which is the video signal (image signal) output from the switch 30, into a digital image signal. The A/D converter 31 sends this converted digital image signal to a DSP (Digital Signal Processor) 32 on the subsequent stage.

The DSP 32 executes predetermined signal processing for the digital image signal received from the A/D converter 31, and outputs the execution result to a frame rate conversion unit 101. This predetermined signal processing includes image processing, such as a contrast adjustment, a brightness adjustment, a color conversion, and a resolution conversion.

The frame rate conversion unit 101 converts the frame rate of the digital image signal input from the DSP 32. A memory 33 stores the image data of the current frame and the image data of the next frame. Obviously, the memory 33 may store other necessary information, as needed.

A TG (Timing Generation circuit) 34 outputs a timing signal that defines an operation timing for each unit constituting the projection type display device 200. A sub-frame image generation unit 103 processes the digital image signal output from the frame rate conversion unit 101 to improve a moving image characteristic, such as moving image blurring. A polarity reversal unit 106 reverses the polarity of the digital image signal processed by the sub-frame image generation unit 103. A D/A converter 35 converts the digital image signal, whose polarity is reversed by the polarity reversal unit 106, into an analog image signal, and outputs the converted analog image signal to a panel driver 36.

The panel driver 36 sends the R, G, and B component signals of this analog image signal to the liquid-crystal panels 2R, 2G, and 2B, respectively. The panel driver 36 supplies power to each of the liquid-crystal panels 2R, 2G, and 2B. Obviously, it is also effective to provide the projection type display device 200 with digital signal input terminals such as LVDS and TMDS and a D4 terminal for digital TVs in addition to the above arrangement. A ballast 57 is a lamp power supply connected to the lamp 1. Reference numeral 58 denotes a system power supply; and reference numberal 60 denotes an AC inlet.

The user operates a remote controller 61 to issue various instructions to the projection type display device 200. A control panel 62 receives the instruction signal sent from the remote controller 61, decodes it, and notifies a CPU 63 of the resultant information. A brightness adjustment SW (switch) detection unit 109 detects the operation of a brightness adjustment SW (switch) 204.

The CPU 63 controls the overall apparatus by using computer programs and data stored in a ROM 64 and a RAM 65. The ROM 64 stores set data in this apparatus and information described as known information. When some of the above units constituting the video signal processing apparatus 3 are to be implemented by computer programs, the ROM 64 stores them, and the CPU 63 executes them.

The RAM 65 has an area for temporarily storing data externally received via a USB I/F 107 and a work area to be used by the CPU 63. Reference numeral 121 denotes a terminal for receiving various kinds of external information (USB outputs). The USB I/F 107 functions as an I/F for receiving the information input via the terminal 121.

The operation of the frame rate conversion unit 101 will be described next in detail.

The frame rate conversion unit 101 divides the image signal of one frame into the image signals of N (N≧2: N is an integer) sub-frames. This also increases the frame rate by N times. This embodiment will exemplify a case in which N is two. The embodiment will exemplify, for example, a case in which an input image signal having a vertical frequency of 60 Hz is converted into a signal having a double-vertical frequency (120 Hz) frame rate. In this case, the memory 33 stores the input image of at least one frame. Changing the read speed of input image data from the memory 33 can convert the input image signal into an image signal having a different frame rate.

Figure 4:
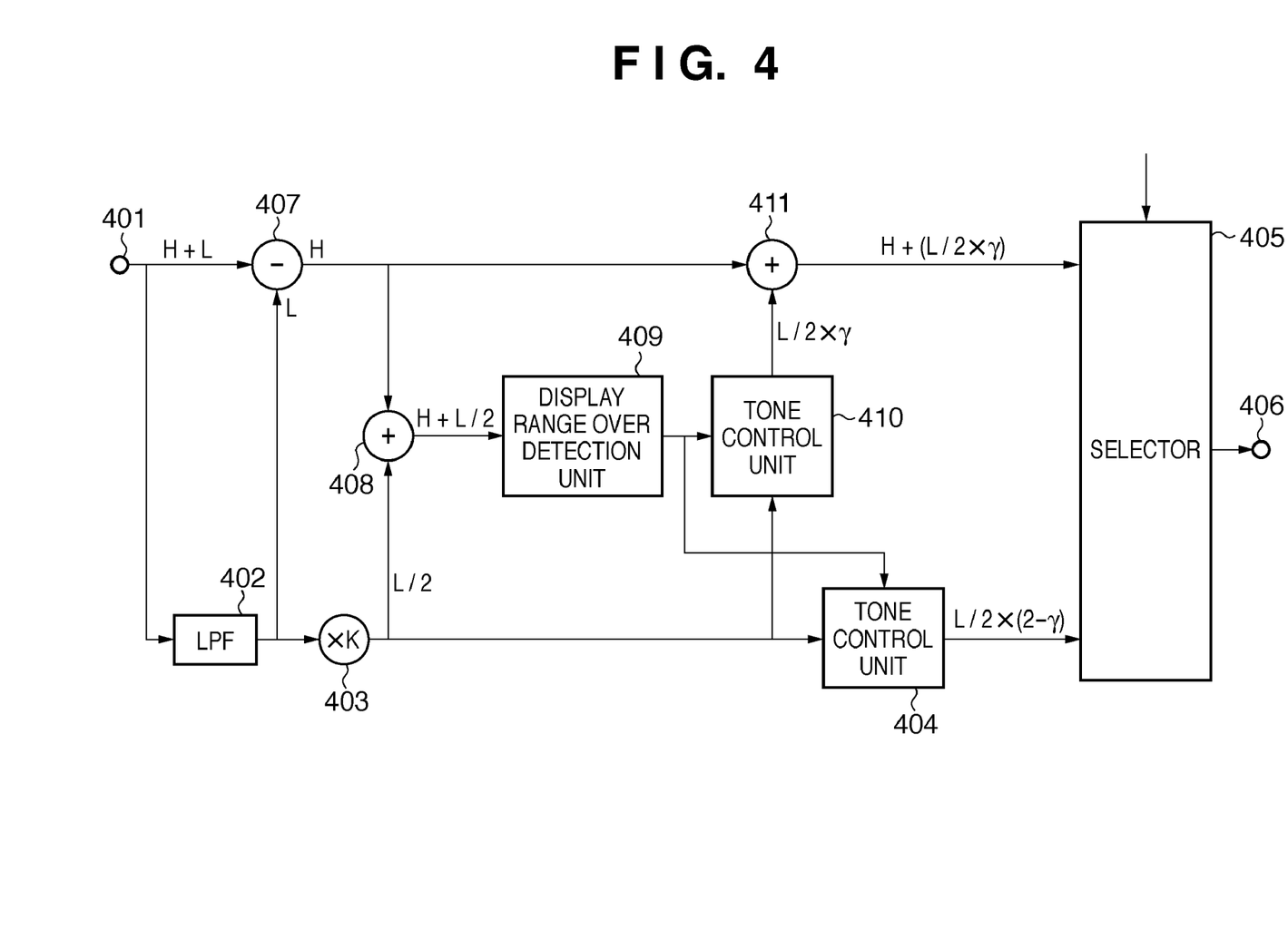
FIG. 4 is a block diagram showing an example of the functional arrangement of the sub-frame image generation unit 103.

The operation of the sub-frame image generation unit 103 will be described in more detail next. FIG. 4 is a block diagram showing an example of the functional arrangement of the sub-frame image generation unit 103. The sub-frame image generation unit 103 sequentially receives the respective sub-frames constituting one frame, processes them, and outputs the resultant information.

A subtractor 407 and an LPF (Low-Pass Filter) 402 receive the image signal of a sub-frame of interest output from the frame rate conversion unit 101 via a terminal 401. In this case, this image signal is constituted by high-frequency components H and low-frequency components L. Referring to FIG. 4, the image signal input via the terminal 401 is represented by H+L.

The LPF 402 outputs an image signal L (second image signal) constituted by low-frequency components by cutting the high-frequency components of the input image signal H+L. The subtractor 407 and a coefficient unit 403 receive the image signal L.

The subtractor 407 outputs an image signal H (first image signal) constituted by the high-frequency components by subtracting the low-frequency components, i.e., the image signal L, from the image signal H+L input via the terminal 401.

The coefficient unit 403 generates and outputs an image signal KL (third image signal) by multiplying the image signal L by a coefficient K (a constant value K satisfying 0<K<1). In this embodiment, since the number of sub-fields is two, ½, which is the reciprocal of two, is used as K. Therefore, the third image signal is expressed as an image signal L/2. This is because, in this embodiment, low-frequency components are displayed ½ by ½ with respect to two sub-frames.

An adder 408 generates an image signal H+L/2 by adding the image signal L/2 output from the coefficient unit 403 to the image signal H output from the subtractor 407, and then outputs the signal H+L/2 as the fourth image signal. However, if the image signal H constituted by high-frequency components is added to the image signal L/2 constituted by low-frequency components, a portion exceeding a predetermined display range (D range) may occur. This portion cannot be displayed, and hence the high-frequency components are displayed while being caused to collapse and distort, resulting in great deterioration of image quality.

This embodiment therefore processes the image signal L/2 so as to remove the portion exceeding the display range (in general, the range of video signal levels (D range) which a device to which an image signal is output can express).

Upon receiving the image signal H+L/2 from the adder 408, a display range over detection unit 409 checks whether a portion exceeding the D range is included (exists) in the image signal H+L/2. If such a portion exists, the display range over detection unit 409 notifies a tone control unit 410 on the subsequent stage of the corresponding information.

Upon receiving the image signal L/2 from the coefficient unit 403, and notification that a portion exists exceeding the D range, the tone control unit 410 controls the tone of the image signal L/2 by multiplying the image signal L/2 by a coefficient γ (correction amount) so as to remove the portion exceeding the D range, and outputs an image signal L/2×γ after performing control. Upon determining that there is no portion exceeding the D range (the signal falls within the display range), the display range over detection unit 409 notifies the tone control unit 410 of the corresponding information. The tone control unit 410 therefore outputs the image signal L/2 received from the coefficient unit 403 without any change (in this case, γ=1).

Upon receiving the image signal L/2 from the coefficient unit 403, a tone control unit 404 controls the tone of the image signal L/2 by multiplying the image signal L/2 by a coefficient 2−γ, and outputs an image signal L/2×(2−γ) after control as the fifth image signal.

An adder 411 generates and outputs an image signal H+L/2×γ as a composition signal by adding the image signal H output from the subtractor 407 to the image signal output from the tone control unit 410 (image signal L/2×γ or the image signal L/2).

A selector 405 receives the image signal H+L/2×γ from the adder 411 and the image signal L/2×(2−γ) from the tone control unit 404. The selector 405 alternately outputs these signals for each sub-frame. Assume that a frame of interest has the first sub-frame, the second sub-frame, the third sub-frame, . . . . In this case, when the terminal 401 receives the image signal of the first sub-frame, the selector 405 selects the image signal H+L/2×γ as an image signal for playing back the first sub-frame, and outputs it. Subsequently, when the terminal 401 receives the image signal of the second sub-frame, the selector 405 selects the image signal L/2×(2−γ) as an image signal for playing back the second sub-frame, and outputs it. When the terminal 401 receives the image signal of the third sub-frame, the selector 405 selects the image signal H+L/2×γ as an image signal for playing back the third sub-frame, and outputs it. In this manner, the selector 405 alternately selects these signals on a sub-frame basis, and outputs them. An output from the selector 405 is sent to the polarity reversal unit 106 on the subsequent stage via a terminal 406.

The operation of the display range over detection unit 409 and tone control unit 410 will be described in more detail next with reference to FIGS. 5A to 5D. Referring to FIGS. 5A to 5D, the abscissa represents the low-frequency component level (L) of a pixel of interest; and the ordinate represents the result obtained by adding the low-frequency component L and the high-frequency component H (i.e., an output from the adder 411 or the adder 408). The amount by which a high-frequency component is added to a low-frequency component of an image differs for each pixel.

Figure 5A:
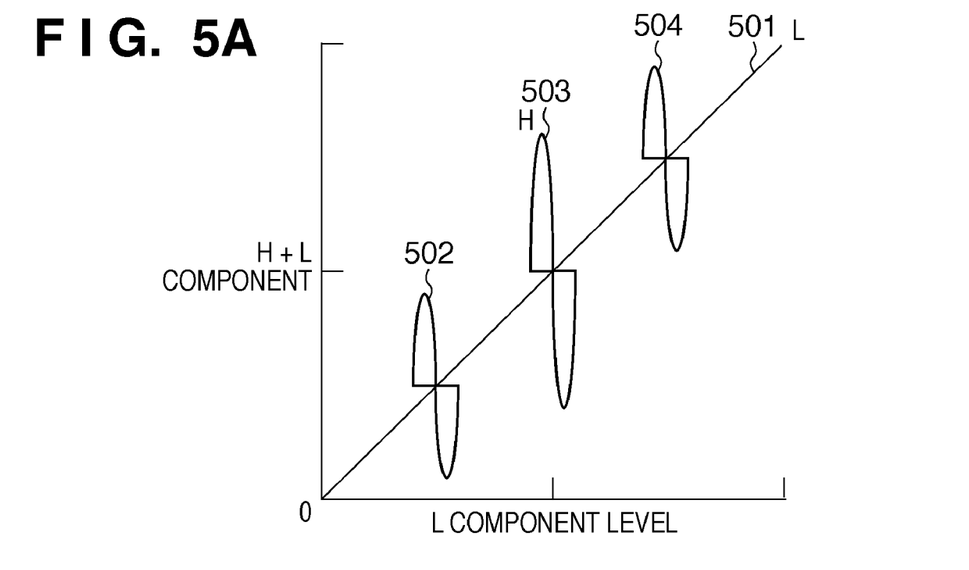
FIG. 5A is a graph showing the relationship between the low-frequency components and the high-frequency components separated by an LPF 402.

FIG. 5A is a graph showing the relationship between the low-frequency components and the high-frequency components separated by the LPF 402. Referring to FIG. 5A, reference numeral 501 denotes the levels of low-frequency components; and reference numerals 502, 503, and 504 denote high frequency components superimposed on low-frequency components. In this case, the amount by which a high-frequency component is superimposed on a low-frequency component differs for each pixel in accordance with a display image.

Figure 5B:
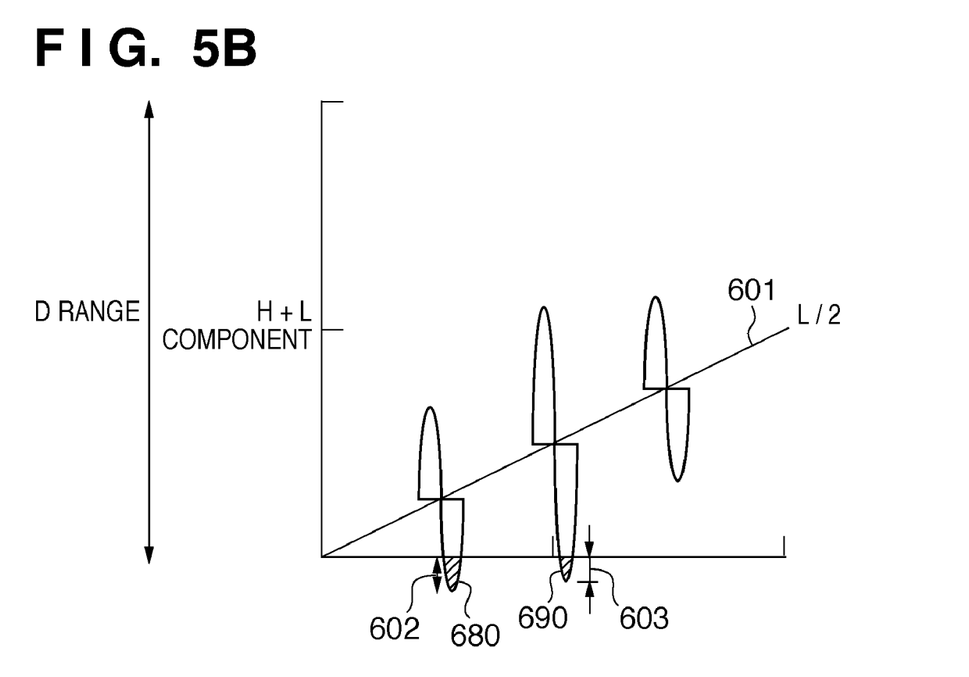
FIG. 5B is a graph showing the relationship between low-frequency components and outputs from an adder 408.

FIG. 5B is a graph showing the relationship between low-frequency components and outputs from the adder 408. As shown in FIG. 5B, when H is added to L/2, portions 680 and 690 (indicated by the hatching) exceeding the display range (D range) are generated. As described above, since these portions cannot be displayed, the high-frequency components collapse, resulting in a distorted image. That is, the image quality greatly deteriorates. This embodiment has an object to remove the portions 680 and 690.

Figure 5C:
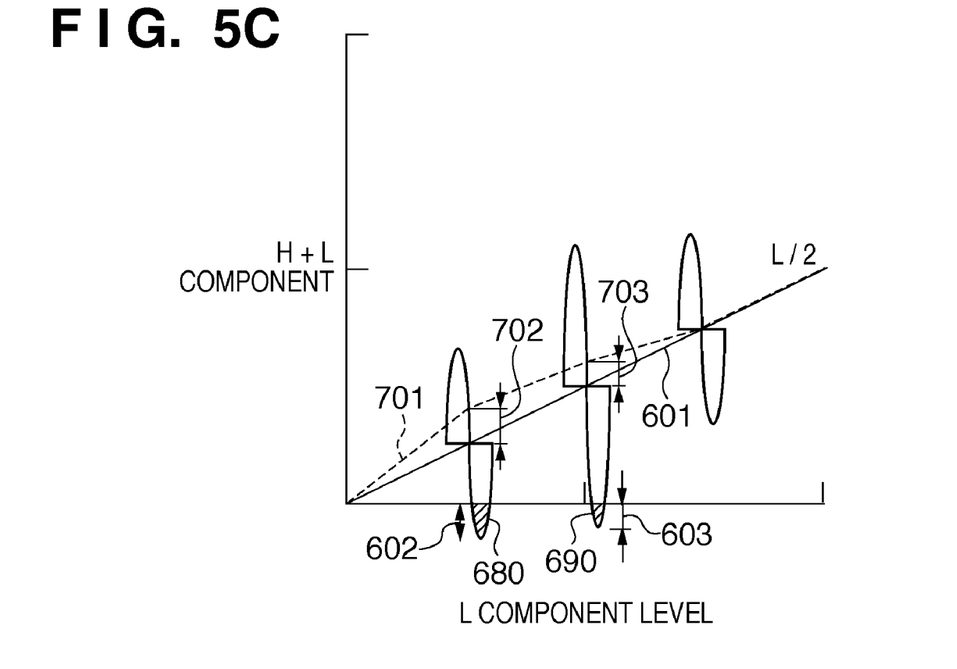
FIG. 5C is a graph for explaining the processing of operating low-frequency components to remove portions 680 and 690 which exceed a D range.

FIG. 5C is a graph for explaining the processing of operating low-frequency components to remove the portions 680 and 690 exceeding the D range. This processing improves the deterioration of image quality. More specifically, a low-frequency component on which a high-frequency component including the portion 680 is superimposed, is biased (multiplied by γ) by the amount denoted by reference numeral 702. This raises the tone conversion characteristic 601 of the low-frequency component, on which the high-frequency component including the portion 680 is superimposed, by the amount denoted by reference numeral 702 (=amount denoted by reference numeral 602). Likewise, a low-frequency component on which a high-frequency component including the portion 690 is superimposed is biased (multiplied by γ) by the amount denoted by reference numeral 703. This raises the tone conversion characteristic 601 of the low-frequency component, on which the high-frequency component including the portion 690 is superimposed, by the amount denoted by reference numeral 703 (=amount denoted by reference numeral 603). With these processes, a tone conversion characteristic 701 is obtained. This removes the portions 680 and 690.

Figure 5D:
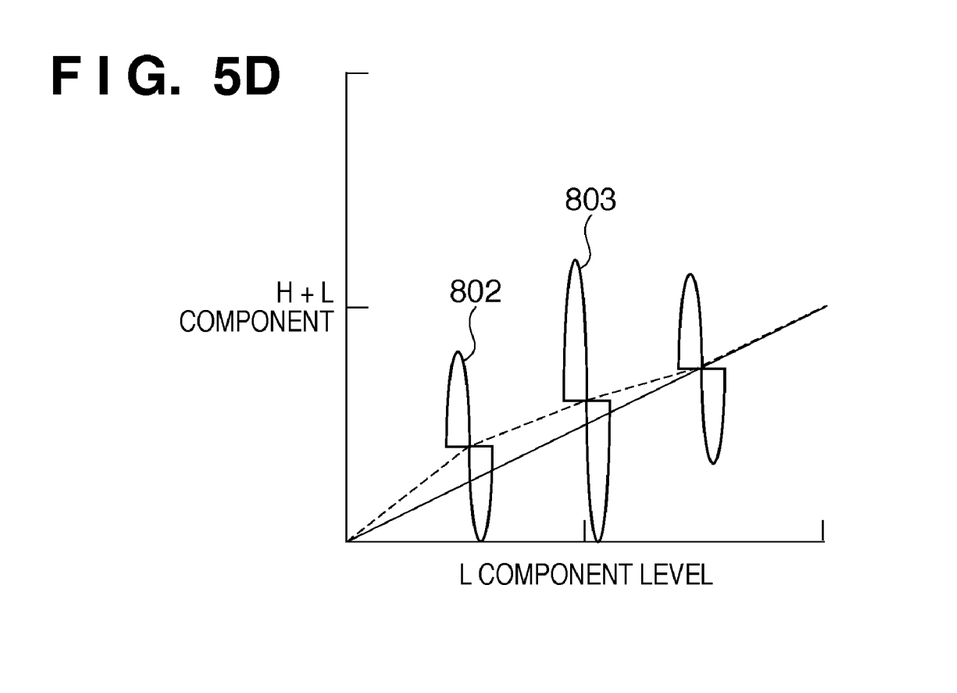
FIG. 5D is a graph showing the results obtained by adding high-frequency components to processed low-frequency components.

FIG. 5D is a graph showing the results obtained by adding high-frequency components to low-frequency components processed in the above manner. As denoted by reference numerals 802 and 803, portions exceeding the D range are removed. This can make the high-frequency components fall within the D range without collapse and distortion. In this case, it is possible to perform filter processing so as to make the tone conversion characteristic have smooth changes between tones. In addition, this arrangement for tone conversion may include a LUT (LookUp Table) using a memory or a circuit for performing function calculation. Alternatively, adjusting the timing of computation by using a delay circuit and the like can process an image exceeding the display range in real time.

If, for example, a computation result is reflected in an image with a delay of one frame, no problem arises in the case of still images. In the case of moving images, however, the display position of a pixel exceeding the display range differs from that of an image reflecting the computation result.

According to the above description, this embodiment allows the display device to perform display fully using the dynamic range of display tones without the collapse of high-frequency components even in a case in which a moving image characteristic, such as moving image blurring, is improved. In addition, it is possible to avoid the display of unnecessary pseudo-components and improve the moving image characteristics without any deterioration of image quality.

Figure 1:
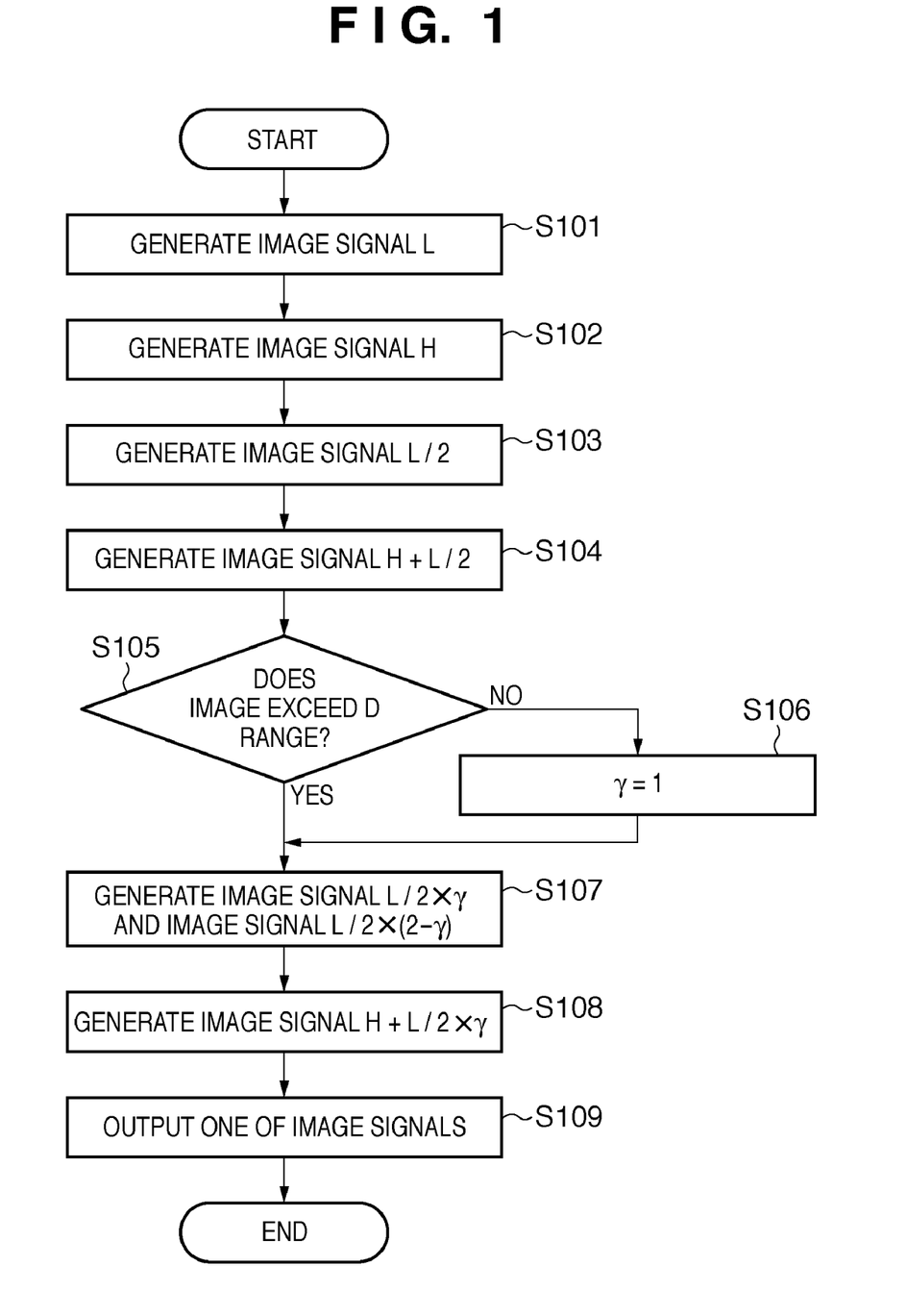
FIG. 1 is a flowchart showing processing which a sub-frame image generation unit 103 performs for a sub-frame of interest.

FIG. 1 is a flowchart showing the processing operations that the sub-frame image generation unit 103 performs for a sub-frame of interest. In practice, therefore, the sub-frame image generation unit 103 performs processing for the image signal of each sub-frame in accordance with the flowchart shown in FIG. 1.

First of all, in step S101, the LPF 402 outputs the image signal L constituted by low-frequency components by cutting high-frequency components of the input image signal H+L. The subtractor 407 and the coefficient unit 403 receive the image signal L.

In step S102, the subtractor 407 outputs the image signal H constituted by high-frequency components by subtracting the low-frequency components, i.e., the image signal L, from the image signal H+L input via the terminal 401. In step S103, the coefficient unit 403 generates and outputs the image signal L/2 by multiplying the image signal L by a coefficient of ½ as a constant value.

In step S104, the adder 408 generates and outputs the image signal H+L/2 by adding the image signal L/2 output from the coefficient unit 403 and the image signal H output from the subtractor 407.

In step S105, upon receiving the image signal H+L/2 from the adder 408, the display range over detection unit 409 checks whether the image signal H+L/2 includes any portion exceeding the D range. If the signal includes a portion exceeding the D range, the process advances to step S107. If the signal includes no portion exceeding the D range, the process advances to step S106.

In step S106, the tone control units 410 and 404 set γ to 1. In step S107, upon receiving the image signal L/2 from the coefficient unit 403, the tone control unit 410 generates and outputs the image signal L/2×γ by multiplying the image signal L/2 by the coefficient γ. In addition, upon receiving the image signal L/2 from the coefficient unit 403, the tone control unit 404 generates and outputs the image signal L/2×(2−γ) by multiplying the image signal L/2 by the coefficient 2−γ.

In step S108, the adder 411 generates and outputs the image signal H+L/2×γ by adding the image signal H output from the subtractor 407 and the image signal L/2×γ output from the tone control unit 410.

In step S109, the selector 405 outputs either the image signal H+L/2×γ from the adder 411 or the image signal L/2×(2−γ) from the tone control unit 404.

This embodiment has exemplified the case in which when a frame is divided into N sub-frames, a high-frequency (H) component image is displayed in one of the N sub-frames, and a low-frequency (L) component image is divided and displayed 1/K by 1/K in each of the N sub-frames. However, the present invention is not limited to this. It is possible to display an H component at K× magnification and an L component at 1× magnification as long as the ratio between the H component and the L component satisfies a desired condition (H:L=K:1).

[Second Embodiment]

Figure 6:
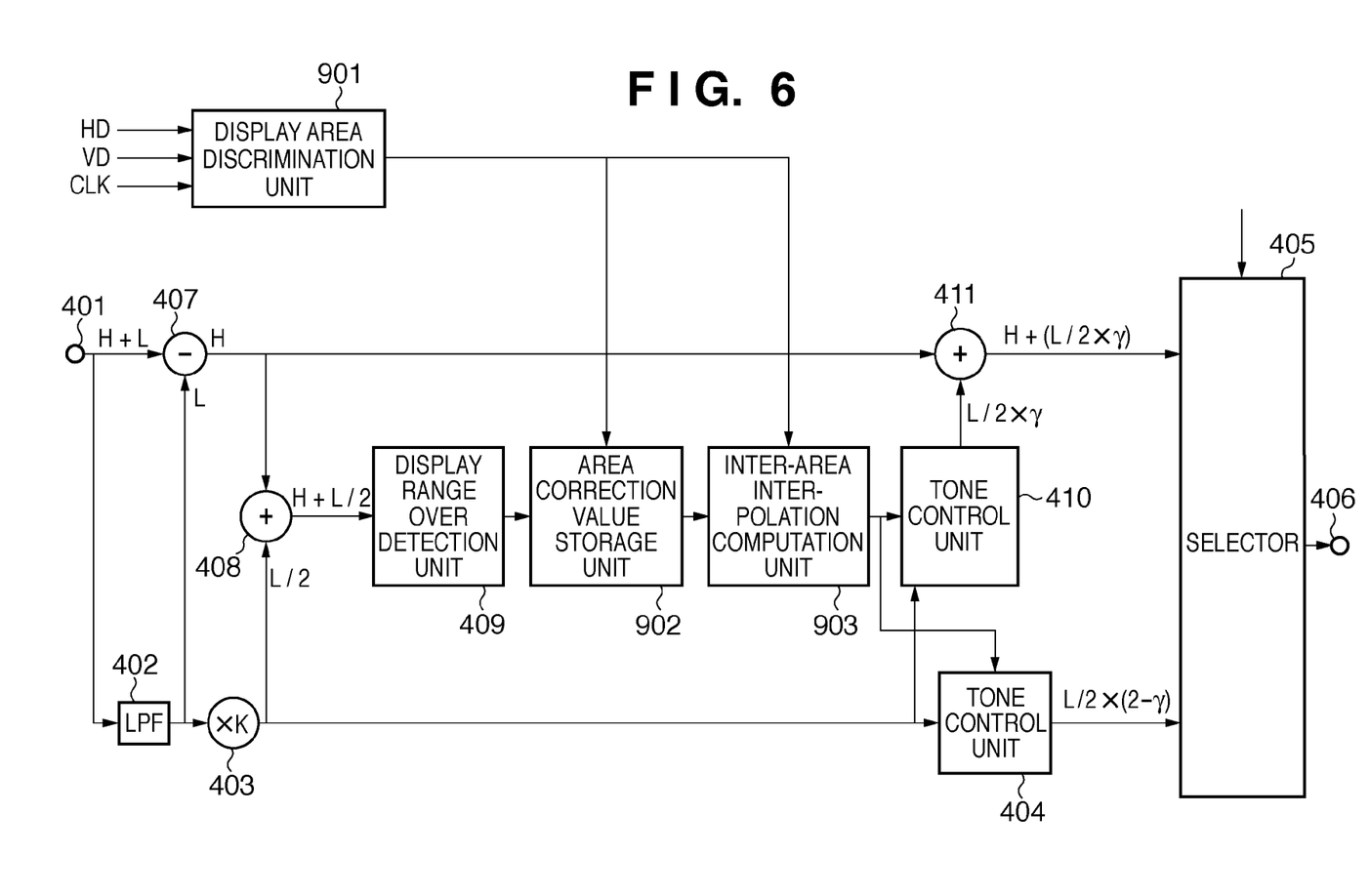
FIG. 6 is a block diagram showing an example of the functional arrangement of a sub-frame image generation unit 103 according to the second embodiment of the present invention.

This embodiment divides the display area of an image into a plurality of partial areas and performs the processing described in the first embodiment for each partial area. FIG. 6 is a block diagram showing an example of the functional arrangement of a sub-frame image generation unit 103 according to this embodiment. The same reference numerals as in FIG. 4 denote the same parts in FIG. 6, and a description of them will be omitted.

A display area discrimination unit 901 determines an area within the display screen by counting HD and VD sync signals and pixel clocks CLK. An area correction value storage unit 902 stores the D range over amount (the amount by which the D range is exceeded) detected by a display range over detection unit 409 for each area. An inter-area interpolation computation unit 903 performs correction by using a tone conversion characteristic corresponding to an area including the display position of a pixel of interest.

When performing interpolation, the inter-area interpolation computation unit 903 acquires correction values for four neighboring areas relative to the low-frequency component value of a pixel of interest, interpolates the values in accordance with the display positions within the areas, and uses the resultant values. It is possible to use, as an interpolation method, linear interpolation, cubic interpolation, the spline method, or the like.

This embodiment can perform tone control for each area and optimally control black and white levels for each area. This allows the effective use of the display range (dynamic range) within the display screen. It is therefore possible to display a well-contrasted image.

[Third Embodiment]

Figure 7:
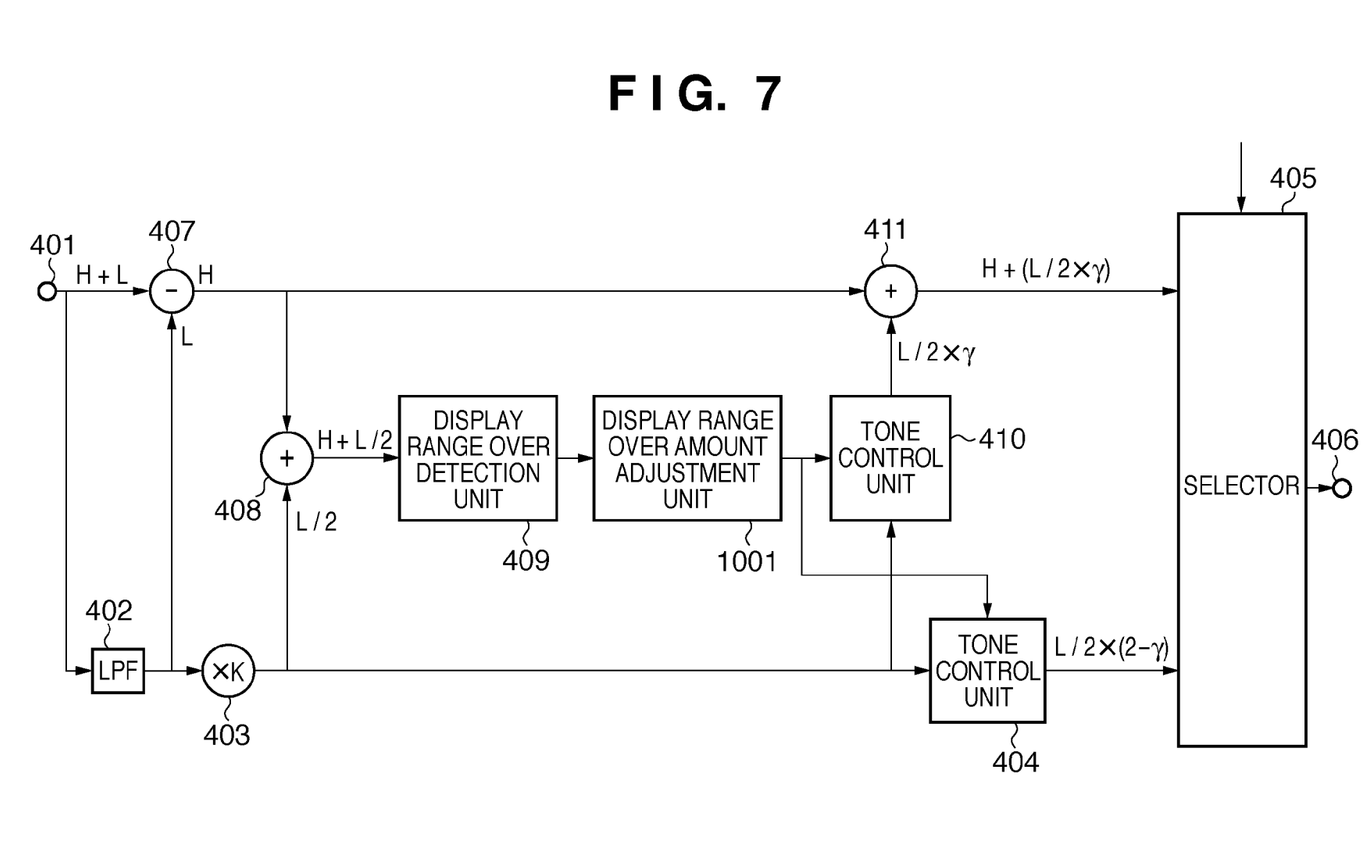
FIG. 7 is a block diagram showing an example of the functional arrangement of a sub-frame image generation unit 103 according to the third embodiment of the present invention.

In this embodiment, a display range over amount adjustment unit 1001 can adjust the D range over amount in accordance with a display image by adjusting the D range over amount detected by a display range over detection unit 409. This can implement image quality control according to user's preference.

FIG. 7 is a block diagram showing an example of the functional arrangement of a sub-frame image generation unit 103 according to this embodiment. The same reference numerals as in FIG. 4 denote the same parts in FIG. 7, and a description of them will be omitted. The display range over amount adjustment unit 1001 obtains a D range over amount C by performing the processing based on the following equation for a D range over amount A detected by the display range over detection unit 409.

D range over amount C=D range over amount A−adjustment amount B

The display range over amount adjustment unit 1001 sends the D range over amount C again to the display range over detection unit 409. The display range over detection unit 409 therefore checks whether the D range over amount C exceeds the D range. This makes it possible for the detection range of D range over amounts to have a certain width. Obviously, the subsequent processing will use the D range over amount C.

In one example, depending on the image, the tones of the image can actively be caused to collapse. In this case, it is possible to trade off portions exceeding the display range to some extent. This is because it is not always necessary to display all the tones. In this case, a DSP 32 computes and determines the adjustment amount B based on the luminance information of an image (the distribution, the average luminance, the maximum luminance, and the minimum luminance) and the like.

According to this embodiment, it is possible to perform control while the range in which D range over amounts are detected is made to have a certain width. This allows the user to obtain an image according to the user's preference. In addition, changing the compression ratio in accordance with a D range over amount can perform tone control without image saturation like excessive brightness/excessive darkness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-089575 filed Apr. 1, 2009 which is hereby incorporated by reference herein in its entirety.

What is claimed is:

1. An image processing apparatus which processes and outputs an image signal input for each frame, comprising:
    a division unit which divides one frame of interest into a plurality of sub-frames;
    an acquisition unit which acquires a first image signal constituted by high-frequency components and a second image signal constituted by low-frequency components from an image signal of a sub-frame of interest;
    a unit which generates a third image signal by multiplying the second image signal by a constant value K satisfying 0<K<1;
    a process unit which outputs the third image signal when a fourth image signal obtained by adding the first image signal and the third image signal falls within a predetermined range and outputs, when the fourth image signal includes a portion exceeding the range, an image signal obtained by correcting the third image signal so as that the portion does not exceed the range;
    a unit which generates a composition signal composed of the image signal output from said process unit and the first image signal;
    a unit which generates a fifth image signal by multiplying the third image signal by a constant value (2−γ) when γ represents a correction amount for the third image signal from said process unit; and
    an output unit which outputs one of the composition signal and the fifth image signal as the sub-frame of interest.

2. The apparatus according to claim 1, wherein said division unit divides the image signal of the frame of interest into a plurality of sub-frames by converting a frame rate of the image signal of the frame of interest into a frame rate corresponding to a vertical frequency higher than a vertical frequency of the image signal of the frame of interest.

3. The apparatus according to claim 1, wherein the constant value K is a reciprocal of the number of sub-frames constituting the frame of interest.

4. The apparatus according to claim 1, wherein said acquisition unit acquires the second image signal by using a low-pass filter for the image signal of the frame of interest, and acquires the first image signal by subtracting the second image signal from the image signal of the frame of interest.

5. The apparatus according to claim 1, wherein the range is a range of signal levels which a display device, as an output destination of said output unit, can express.

6. The apparatus according to claim 1, wherein said output unit alternately outputs the composition signal and the fifth image signal for each sub-frame.

7. The apparatus according to claim 1, wherein said apparatus processes the input image signal for the frame of interest in such a manner so as to i) divide the display area of an image of the signal to be output from the output unit to a display unit for the frame of interest into a plurality of partial areas and ii) perform processing of the input image signal of each partial area via the acquisition unit, the third-image-signal generation unit, the process unit, the composition-signal generation unit, the fifth-image-signal generation unit, and the output unit.

8. An image processing method performed by an image processing apparatus which processes and outputs an image signal input for each frame, comprising the steps of:
    dividing one frame into a plurality of sub-frames;
    acquiring a first image signal constituted by high-frequency components and a second image signal constituted by low-frequency components from an image signal of a sub-frame of interest;
    generating a third image signal by multiplying the second image signal by a constant value K satisfying 0<K<1;
    outputting the third image signal when a fourth image signal obtained by adding the first image signal and the third image signal falls within a predetermined range and outputting, when the fourth image signal includes a portion exceeding the range, an image signal obtained by correcting the third image signal so as that the portion does not exceed the range;
    generating a composition signal composed of the image signal output in the step of processing and the first image signal;
    generating a fifth image signal by multiplying the third image signal by a constant value (2−γ) when γ represents a correction amount for the third image signal in the step of processing; and
    outputting one of the composition signal and the fifth image signal as the sub-frame of interest.

* * * * *